United States Patent
Roberts et al.

(10) Patent No.: US 6,942,910 B2
(45) Date of Patent: Sep. 13, 2005

(54) STRUCTURAL HYBRID BEAM UTILIZING AN EXTRUDED PROFILE

(75) Inventors: Ronald K. Roberts, Dearborn, MI (US); Daniel P. Reed, Warren, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 41 days.

(21) Appl. No.: 10/405,457

(22) Filed: Apr. 2, 2003

(65) Prior Publication Data

US 2004/0197528 A1 Oct. 7, 2004

(51) Int. Cl.[7] .......................... B29D 22/00; B29D 23/00; B32B 1/08
(52) U.S. Cl. .......................... 428/35.8; 428/63; 428/67; 296/208; 296/70; 296/901.01
(58) Field of Search .................. 428/99, 35.7, 457, 428/121, 122, 35.8, 131, 63, 67; 52/735.1, 309.2, 309.1, 731.1, 731.2, 731.3, 731.4, 731.6, 732.1, 732.3, 738.1, 730.5; 296/208, 190.06, 100.16, 203.03, 106.93, 190.02, 203.02, 39.2, 70, 72, 193.02, 214, 901.01; 293/1; 454/69; 180/90, 89.19

(56) References Cited

U.S. PATENT DOCUMENTS

| | | |
|---|---|---|
| 3,054,636 A | 9/1962 | Wessells, III |
| 3,470,598 A | 10/1969 | Bertheisen |
| 4,288,896 A | 9/1981 | West et al. |
| 4,440,434 A | 4/1984 | Celli |
| 4,457,547 A | 7/1984 | Sekiyama et al. |
| 4,863,771 A | 9/1989 | Freeman |
| 5,190,803 A | 3/1993 | Goldbach et al. |
| 5,656,353 A | 8/1997 | Butler |
| 5,823,602 A | 10/1998 | Kelman et al. |
| 5,846,634 A | 12/1998 | Werth et al. |
| 5,888,600 A | 3/1999 | Wycech |
| 6,096,403 A | 8/2000 | Wycech |
| 6,311,452 B1 | 11/2001 | Barz et al. |
| 6,471,285 B1 | 10/2002 | Czaplicki et al. |
| 6,592,174 B1 * | 7/2003 | Rollin et al. ........... 296/190.08 |
| 6,644,722 B2 | 11/2003 | Cooper |

FOREIGN PATENT DOCUMENTS

WO    WO 00/46094    *  8/2000  ........... B62D/29/00

* cited by examiner

Primary Examiner—Michael C. Miggins
(74) Attorney, Agent, or Firm—Brinks Hofer Gilson & Lione

(57) ABSTRACT

A structural member of the present invention includes a substrate having portions defining an inwardly extending channel and a blow molded member in contact with the substrate. The blow molded member has portions that engage the portions of the substrate that define the inwardly extending channel such that the blow molded member is secured to the substrate.

21 Claims, 4 Drawing Sheets

STRUCTURAL HYBRID BEAM UTILIZING AN EXTRUDED PROFILE

TECHNICAL FIELD OF THE INVENTION

This invention relates to a structural member formed of a metal and reinforced by a blow-molded member. More specifically, this invention relates to a structural member made of extruded metal with a blow-molded hollow plastic reinforcement located in the interior of the extruded metal.

BACKGROUND OF THE INVENTION

Today's automotive design seeks new methods of manufacturing lighter components having increased structural rigidity. Such lightweight components find use in vehicle seats, cross car beams, support brackets, etc. It is also desirable to reduce the number of components in vehicles such that one component performs more than one function. With regard to vehicle cross car beams, much effort has previously focused on utilizing the structural integrity of the outboard register ducts to support the substrate. These previous designs typically required significant reinforcement with an additional steering column support bracket.

SUMMARY OF THE INVENTION

In accordance with the preferred embodiment of the present invention, a structural member is formed of an extruded substrate reinforced by a blow molded member. In order to retain the blow molded member to the substrate, the substrate is provided with an inwardly extending channel formed therein. A portion of the blow-molded member engages the portions of the substrate that define the inwardly extending channel to secure the blow molded member to the substrate, such that the substrate is mechanically bonded to the blow-molded member.

In another aspect of the present invention, the inwardly extending channel has a neck portion defining a first dimension and a body portion defining a second dimension, wherein, the first dimension of the neck portion is smaller than the second dimension of the body portion.

In yet another aspect of the present invention, the inwardly extending channel is adapted to support a plurality of communication members therein.

In still another aspect of the present invention, the inwardly extending channel is adapted to support a mounting device for attaching the structural member to another object.

Further features and advantages of the invention will become apparent to one ordinary skilled in the art from the following discussion and the accompanying drawings.

DETAILED DESCRIPTION

Figure 1:
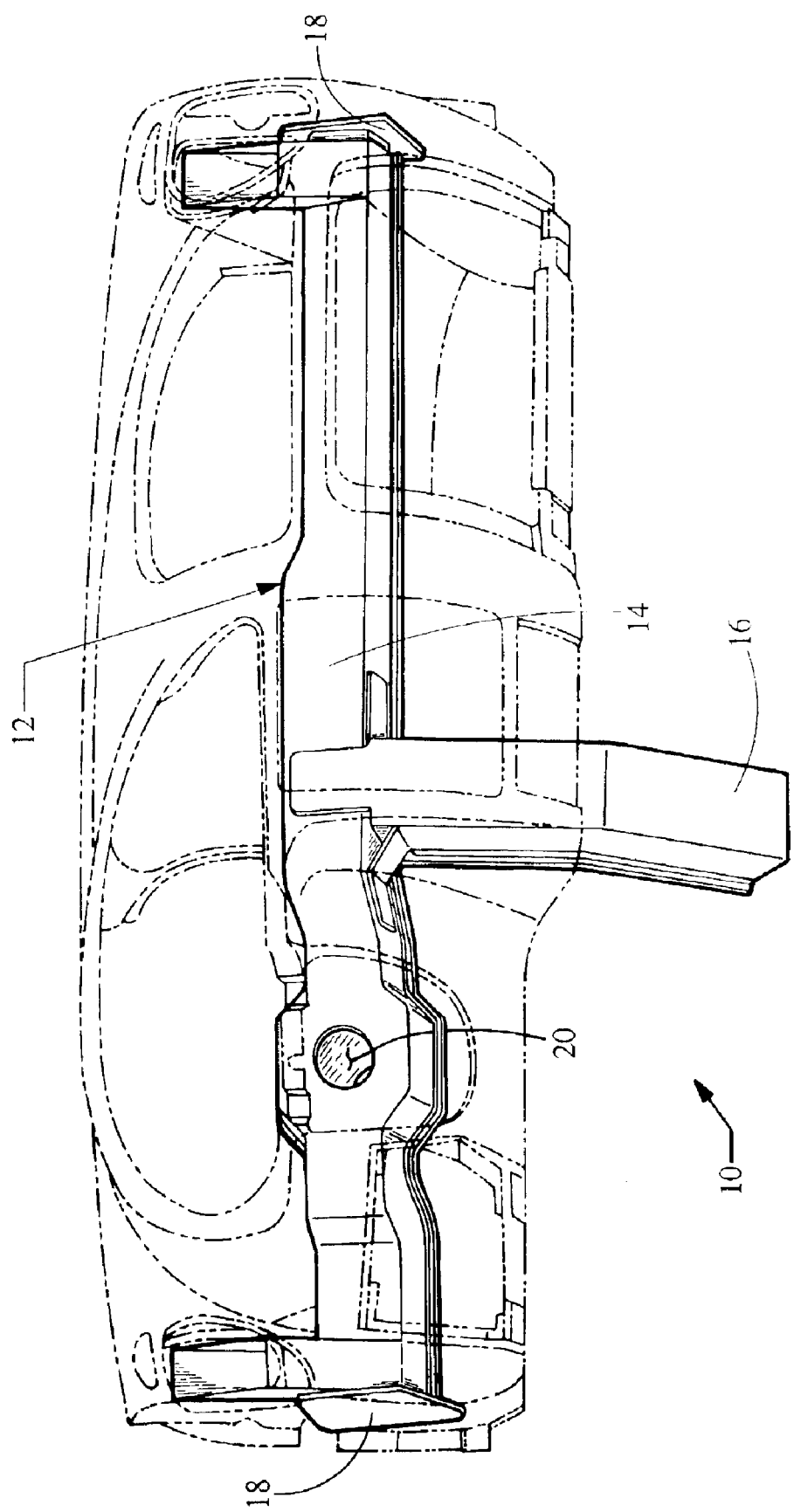
FIG. 1 is a perspective view of a structural member illustrated as a cross car beam in accordance with the teachings of the present invention and showing in phantom an instrument panel as installed in a motor vehicle.
Figure 2:
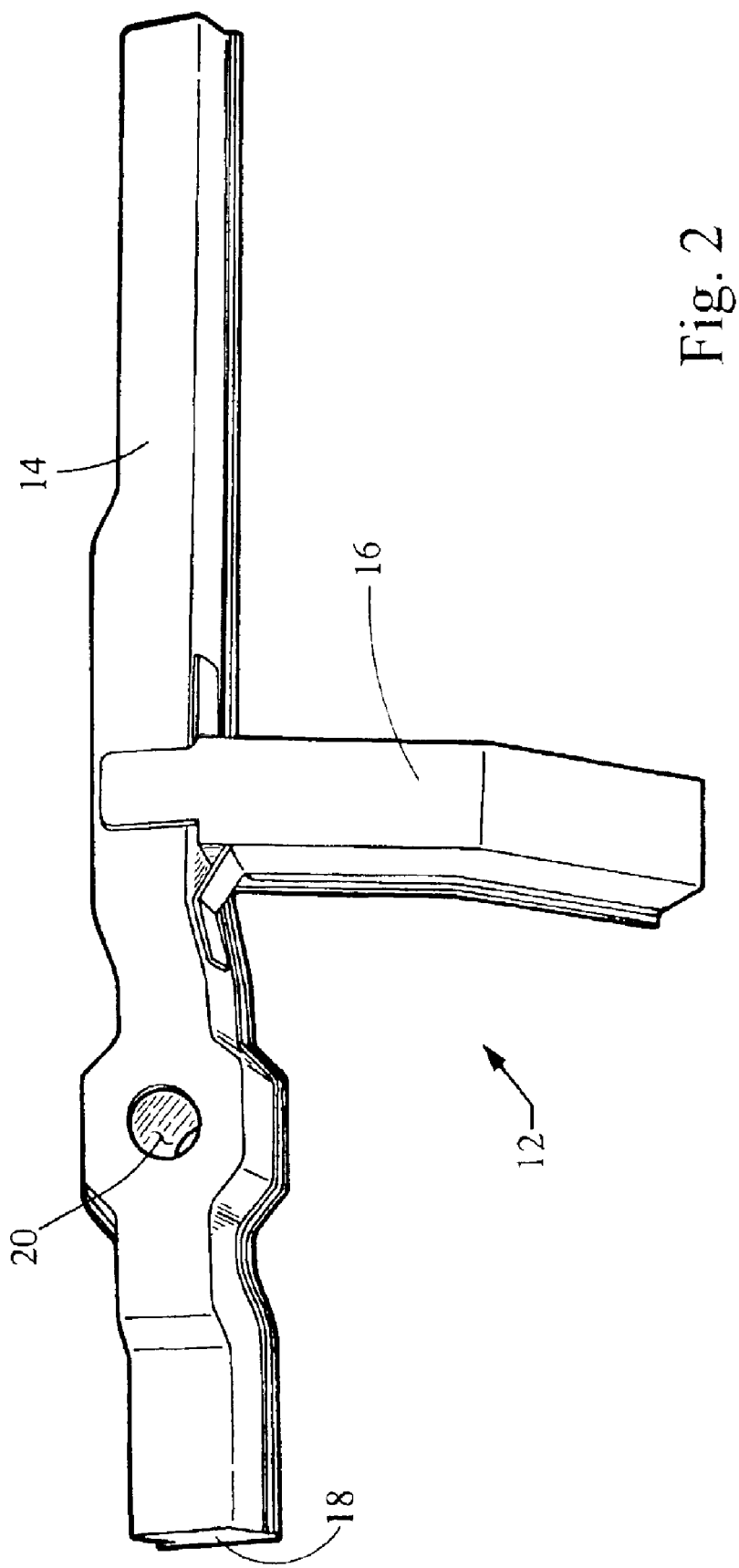
FIG. 2 is a perspective view of the structural member in FIG. 1 shown alone.

Referring to FIGS. 1 and 2, an instrument panel and dashboard 10 (shown in phantom) having a structural member 12 embodying the principles of the present invention is shown therein. The instrument panel 10 and structural member 12 are installed in the interior of a motor vehicle. The structural member 12 is illustrated as a cross bar 14. The cross bar 14 extends horizontally across the motor vehicle generally from the left A pillar 18 to the right A pillar 18. Additionally, the cross bar 14 has an aperture 20 to accommodate a steering wheel and may have additional features to attach different components, such as a glove compartment, an audio system, a display for the climate control, a passenger airbag, etc.

A support bracket 16 serves as an upright support for the cross bar 14. The support bracket 16 is positioned substantially perpendicular to the cross bar 14 and is attached to the cross bar 14 at one end and attached to the floor (not shown) of the motor vehicle at the other end. The structural member 12 forms the backbone of the instrument panel and dashboard 10.

Although in the drawings the structural member 12 is shown and described as a cross beam 14, it must be understood that the structural member 12 is not limited to use exclusively in this arrangement. The structural member 12 can be used in a variety of components in a motor vehicle. For example, it may be used as a duct for the air conditioning unit in a car, or fluid in the radiator support. Alternatively, the structural member 12 may be used in other application not relating to motor vehicles such as routing for electrical lines in a building walls etc.

Figure 3:
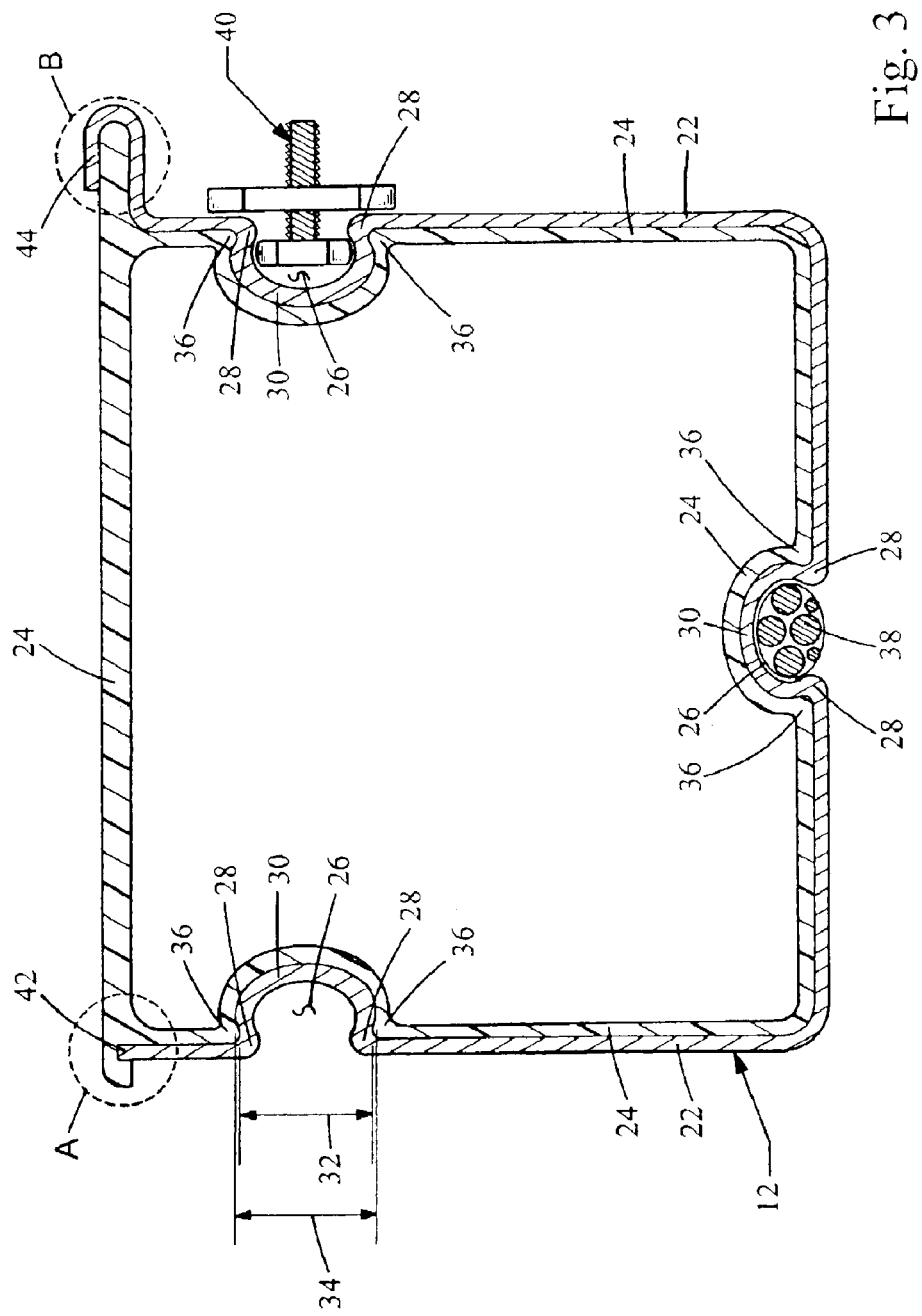
FIG. 3 is a cross sectional view of one embodiment of a structural member incorporating the principles of the present invention.

Referring to FIG. 3, the structural member 12 comprises an extruded substrate 22 and a blow molded member 24 located within and reinforcing the substrate 12. Preferably, the substrate 22 is formed from a suitable metal such as aluminum, iron, copper or alloys thereof. The blow molded member 24 is preferably formed from materials such as plastic, plastic composite or thermoplastic resin such as PET or nylon.

The substrate 22 is formed by extrusion, and an inwardly extending channel 26 in a wall portion 27 of the substrate 22 is part of the extrusion profile. Any appropriate number of inwardly extending channels 26 may be defined in the substrate, and three such channels 26 are shown herein as an example.

The inwardly extending channel 26 is formed such that it is defined by a neck portion 28 and a body portion 30. The neck portion 28 is adjacent to the wall portion 27 of the substrate 22 and defines a first outer dimension 32. The body portion 30 extends from the neck portion 28 toward an interior of the substrate 22 and defines a second dimension 34. This second dimension 34 is greater than the first dimension 32, and the neck portion 28 forms an undercut relative to the body portion 30.

The body portion 30 such that portions 36 of the blow molded member 24 engage the inwardly extending channel 26 and wrap around the inwardly extending channel 26 adjacent the neck portion 28. The portions 36 of the blow molded member 24 adjacent the neck portion 28 are secured in place by the larger body portion 30, as shown in FIG. 3.

The engagement of the blow molded member 24 and the inwardly extending channel 26 provides the necessary mechanical bond to hold the blow molded member 24 to the substrate 22.

The substrate 22 of the structural member 12 can have an open profile, such as that shown in FIG. 3, wherein the substrate 22 provides a substantially C-shaped profile. If the substrate 22 has an open profile, preferably the blow molded member 24 is further secured to the substrate 22 by using a portion of the blow molded member 24 to encapsulate an edge 42 of the substrate 22, as shown by the circle designated by reference letter A of FIG. 3.

Figure 4:
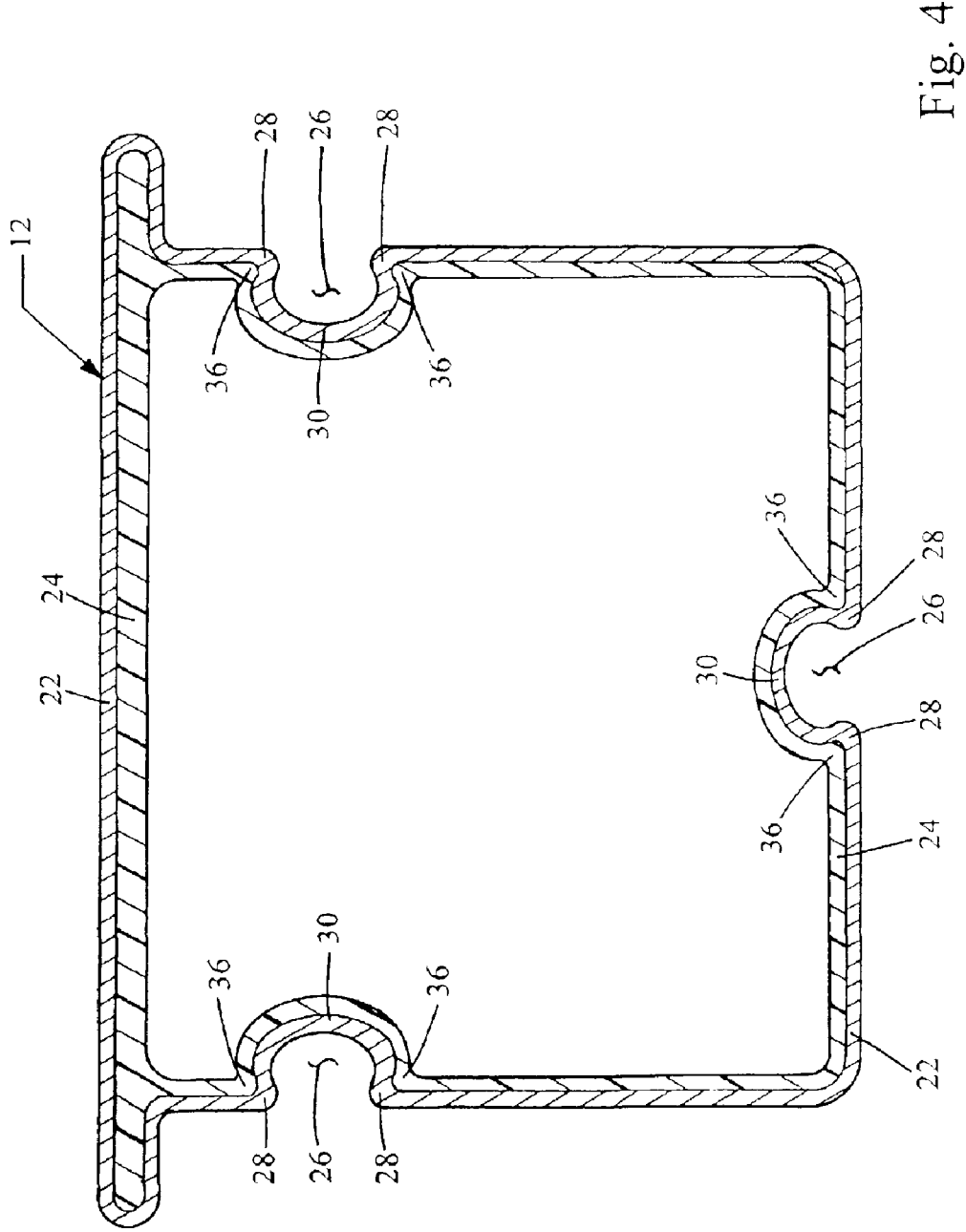
FIG. 4 is a cross sectional view of another embodiment of a structural member incorporating the principles of the present invention.

Alternatively, the blow molded member 24 can be further secured to the substrate 22 by folding a flange portion 44 of the substrate 22 over onto the blow molded member 24, as shown by the circle designated by reference letter B of FIG. 3. The substrate 22 can also have a closed profile, as shown in FIG. 4, wherein the substrate 22 has a substantially circular, or square, or rectangular shape, such that the substrate 22 presents a hollow tubular profile.

The inwardly extending channel 26 can serve various other purposes within the vehicle and elsewhere. Referring to FIG. 3, the inwardly extending channel 26 can be adapted to support communication members 38, such as electrical wiring, or fiber optic cable or other devices adapted to transport electrical current or signals, fluids, air, between various components within the motor vehicle. Further, the inwardly extending channel 26 can also be used to support a mounting device 40 that could be used to attach objects to the structural member 12, or to mount the structural member 12 to another object.

As a person skilled in the art will recognize from the previous description and from the figures and claims, modifications and changes can be made to the preferred embodiment of the invention without departing from the scope of the invention as defined in the following claims.

What is claimed is:

1. A motor vehicle structural member comprising:
   an extruded metal substrate, portions of said substrate defining a channel extending inwardly to one side thereof; and
   a blow molded plastic member located on said one side of said substrate, said blow molded member engaging said portions of said substrate that define said channel such that said blow molded member is secured to said substrate;
   said channel including a neck portion and a body portion, said neck portion positioned adjacent to a wall portion of said substrate and defining a first outer dimension, and said body portion extending from said neck portion toward an interior of said substrate and defining a second dimension, greater than said first dimension, such that said neck portion defines an undercut relative to said body portion, portions of said blow molded member extending around the inwardly extending channel, adjacent the neck portion, and into the undercut;
   said blow molded member and said portions of said substrate being continuous.

2. The structural member of claim 1, wherein the substrate is formed of a material from the group consisting of aluminum, copper, and alloys thereof.

3. The structural member of claim 1, wherein said channel is adapted to support a plurality of communication members therein.

4. The structural member of claim 1 wherein said channel is adapted to support a mounting device for attaching said structural member to another object.

5. The structural member of claim 1 wherein said substrate defines a closed profile.

6. The structural member of claim 1 wherein said substrate defines an open profile.

7. The structural member of claim 6 wherein said blow molded member encapsulates an edge of said substrate to further secure said blow molded member to said substrate.

8. The structural member of claim 6 wherein said substrate includes an extended edge folded over onto said blow molded member to further secure said blow molded member to said substrate.

9. A motor vehicle structural member comprising:
   an extruded metal substrate, portions of said substrate defining a channel extending inwardly to one side thereof, said channel supports a mounting device for attaching said structural member to another object; and
   a blow molded plastic member located on said one side of said substrate, said blow molded member engaging said portions of said substrate that define said channel such that said blow molded member is secured to said substrate;
   said channel including a neck portion and a body portion, said neck portion positioned adjacent to a wall portion of said substrate and defining a first outer dimension, and said body portion extending from said neck portion toward an interior of said substrate and defining a second dimension, greater than said first dimension, such that said neck portion defines an undercut relative to said body portion, portions of said blow molded member extending around the inwardly extending channel, adjacent the neck portion, and into the undercut;
   said blow molded member and said portions of said substrate being continuous.

10. The structural member of claim 9, wherein the substrate is formed of a material from the group consisting of aluminum, copper, and alloys thereof.

11. The structural member of claim 9 wherein said substrate defines a closed profile.

12. The structural member of claim 9 wherein said substrate defines an open profile.

13. The structural member of claim 12 wherein said blow molded member encapsulates an edge of said substrate to further secure said blow molded member to said substrate.

14. The structural member of claim 12 wherein said substrate includes an extended edge folded over onto said blow molded member to further secure said blow molded member to said substrate.

15. A motor vehicle structural member comprising:
   an extruded metal substrate, portions of said substrate defining a channel extending inwardly to one side thereof, said channel supports a plurality of communication members therein; and
   a blow molded plastic member located on said one side of said substrate, said blow molded member engaging said portions of said substrate that define said channel such that said blow molded member is secured to said substrate;
   said channel including a neck portion and a body portion, said neck portion positioned adjacent to a wall portion of said substrate and defining a first outer dimension, and said body portion extending from said neck portion toward an interior of said substrate and defining a second dimension, greater than said first dimension, such that said neck portion defines an undercut relative to said body portion, portions of said blow molded member extending around the inwardly extending channel, adjacent the neck portion, and into the undercut;
   said blow molded member and said portions of said substrate being continuous.

16. The structural member of claim 15, wherein the substrate is formed of a material from the group consisting of aluminum, copper, and alloys thereof.

17. The structural member of claim 15 wherein said channel is adapted to support a mounting device for attaching said structural member to another object.

18. The structural member of claim 15 wherein said substrate defines a closed profile.

19. The structural member of claim 15 wherein said substrate defines an open profile.

20. The structural member of claim 19 wherein said blow molded member encapsulates an edge of said substrate to further secure said blow molded member to said substrate.

21. The structural member of claim 19 wherein said substrate includes an extended edge folded over onto said blow molded member to further secure said blow melded member to said substrate.

* * * * *